United States Patent
Diethorn

(12) 
(10) Patent No.: US 6,442,275 B1
(45) Date of Patent: Aug. 27, 2002

(54) ECHO CANCELER INCLUDING SUBBAND ECHO SUPPRESSOR

(75) Inventor: Eric J. Diethorn, Washington Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/154,991

(22) Filed: Sep. 17, 1998

(51) Int. Cl.$^7$ ............................................... H04M 9/08
(52) U.S. Cl. ........................... 379/406.14; 379/406.05; 379/406.08; 379/406.09; 379/406.1; 379/406.01; 379/406.02
(58) Field of Search ................................ 379/406–410, 379/411, 406.14; 370/32.1

(56) References Cited

U.S. PATENT DOCUMENTS

| | | | |
|---|---|---|---|
| 3,585,311 A | 6/1971 | Berkley et al. | 179/170.2 |
| 3,784,747 A | 1/1974 | Berkley et al. | 179/1 |
| RE28,919 E | 7/1976 | Berkley et al. | 179/170.8 |
| 4,031,338 A | 6/1977 | Campanella et al. | 179/170.8 |
| 4,591,670 A | 5/1986 | Itoh | 179/170.2 |
| 4,644,108 A | 2/1987 | Crouse et al. | 379/406 |
| 5,561,668 A | * 10/1996 | Genter | 379/410 |
| 5,566,167 A | 10/1996 | Duttweiler | 370/32.1 |
| 5,644,596 A | * 7/1997 | Sih | 375/232 |
| 5,933,495 A | * 8/1999 | Oh | 379/410 |

OTHER PUBLICATIONS

Man mohan Sonhi et al., "Silencing Echos on the Telephone Network", Proceedings Of The IEEE, vol. 68, No. 8, Aug. 1980, pp. 948–963.

O.M. Mracek Mitchell et al., "A Full–Duplex Echo Suppressor Using Center–Clipping", BSTJ, vol. 50, No. 3, May–Jun. 1971, pp. 1619–1630.

* cited by examiner

Primary Examiner—Forester W. Isen
Assistant Examiner—Ramnandan Singh

(57) ABSTRACT

Residual echo components resulting from an adaptive echo canceler are minimized by employing a subband echo suppressor. The residual echo components are minimized by individually, controllably adjusting the echo suppressor attenuation level in each of the subbands to gradually attenuate echo peaks having a magnitude lower than a clipping threshold with the magnitude of the attenuation increasing for residual echoes of decreasing magnitude. Additionally, the threshold of suppression engagement is dynamically matched to the signal gain in the echo path for each subband. If the signal gain in a subband is high (strong echo), the suppressor must attenuate residual echo peaks in the subband of higher energy to maintain a constant quality of service.

3 Claims, 2 Drawing Sheets

108

ECHO CANCELER INCLUDING SUBBAND ECHO SUPPRESSOR

TECHNICAL FIELD

This invention relates to echo cancellation and, more particularly, to a subband echo suppressor.

BACKGROUND OF THE INVENTION

In the cancellation of echoes either in telephone systems, acoustic systems or the like, it is desirable to minimize any residual echoes remaining after adaptive echo cancellation. To this end, echo suppressors are often employed as post-processors to adaptive echo cancelers. Of particular interest are so-called subband echo suppressors. In one such echo suppressor, the bandwidth of the voice channel is divided into a plurality of contiguous subbands by employing a bank of passband filters. The output of each filter is center clipped and, then, filtered to remove clipping distortion. The attenuation in each subband is adjusted to continuously reset the clipping level to just remove the entire echo signal in the subband. That is, the clipping level is such that the echo peaks are directly suppressed to zero. See for example, an article authored by O. M. M. Mitchell and D. A. Berkley entitled "A Full-Duplex Echo Suppressor Using Center Clipping," *Bell System Technical Journal*, Vol. 50, pages 1619–1630, 1971 and an article authored by M. M. Sonhi and D. A. Berkley entitled "Silencing Echoes On The Telephone Network," *Proceedings of the IEEE*, Vol. 68, No. 8, pages 948–963, August 1980.

More recently, a subband echo suppressor has been proposed in which a bulk signal gain value for the echo path is generated and used to adjust the attenuation in all the subbands. The threshold of echo suppression engagement is matched to the bulk gain value in the echo path and used in all the subbands, and the suppression attenuation is adjusted uniformly in each subband in response to the bulk gain value whether or not there is any echo component to suppress or there is a larger than average echo component to suppress in any of the subbands.

SUMMARY OF THE INVENTION

These and other problems and limitations of prior known echo suppressors are addressed in a subband echo suppressor by individually, controllably adjusting the echo suppressor attenuation level in each of the subbands to gradually attenuate echo peaks having a magnitude lower than a clipping threshold with the magnitude of the attenuation increasing for residual echoes of decreasing magnitude. Additionally, the threshold of suppression engagement is dynamically matched to the signal gain in the echo path for each subband. If the signal gain in a subband is high (strong echo), the suppressor must attenuate residual echo peaks in the subband of higher energy to maintain a constant quality of service.

DETAILED DESCRIPTION

Figure 1:
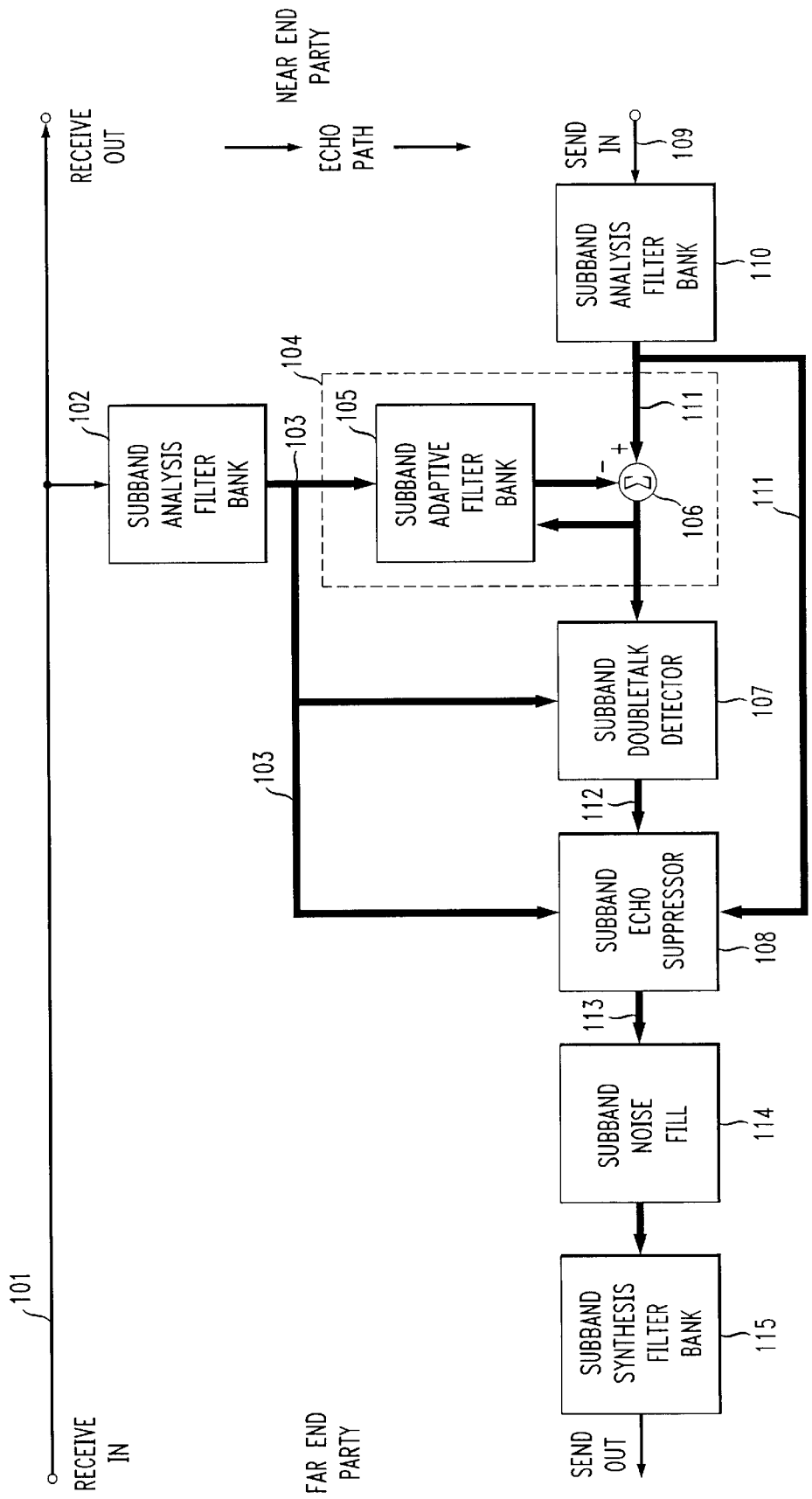
FIG. 1 shows, in simplified block diagram form, details of a subband echo canceler arrangement employing a subband echo suppressor in accordance with the invention.
Figure 2:
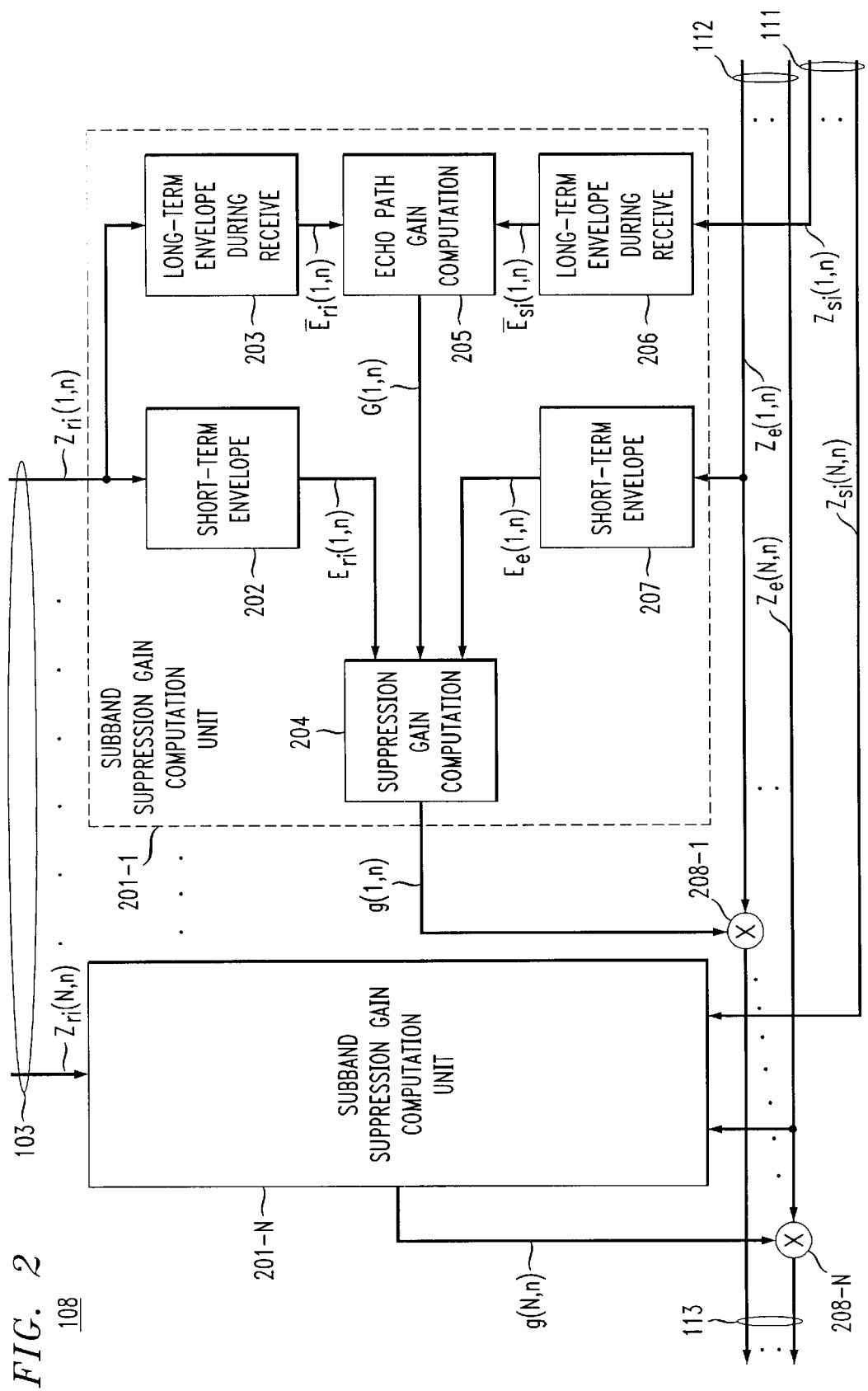
FIG. 2 shows, in simplified block diagram form, details of one embodiment of a subband echo suppressor in accordance with the invention.

FIG. 1 shows, in simplified block diagram form, details of a subband echo canceler arrangement employing a subband echo suppressor in accordance with the invention. Specifically, a received signal from a far end party is supplied via receive path 101 to subband analysis filter bank 102 and to an echo path. An outgoing signal from a near end party including an echo component is supplied via transmit path 109 to subband analysis filter bank 110. Subband analysis filter bank 102 divides the receive channel into a predetermined plurality of frequency subbands by employing passband filters (not shown). Similarly, subband analysis filter bank 107 divides the transmit channel into a predetermined plurality of frequency subbands also by employing passband filters (not shown. The bandwidth of the subbands may all be the same or they may be different from one another, as desired. However, the bandwidths of the subbands in both subband analysis filter banks 102 and 110 are identical. The plurality of subband paths is shown in bold outline in FIG. 1. Thus, signals in the subbands from analysis filter bank 102 are supplied via circuit paths 103 to subband adaptive echo canceler 104 and, therein, to subband adaptive filter bank 105, subband doubletalk detector 107 and subband echo suppressor 108. Subband echo cancelers are known in the art. See for example, U.S. Pat. No. 5,566,167 issued to D. L. Duttweiler on Oct. 15, 1996 for one such subband echo canceler. Details of subband echo suppressor 108 are shown in FIG. 2 and described below. Signals 111 in the subbands from analysis filter bank 110 are supplied to algebraic combining unit 106 and to subband echo suppressor 108. Actually, algebraic combining unit 106 is a plurality of algebraic combining units shown as one for simplicity. Also supplied to algebraic combining unit 106 are a plurality of subband echo estimate signals form subband adaptive filter bank 105, where they are algebraically subtracted on a one-to-one basis from the corresponding plurality of subband signals from subband analysis filter bank 110. The resulting plurality of error signals is supplied to subband adaptive filter bank 105, where they are employed to update the echo estimates being generated, in well known fashion, and to subband doubletalk detector 107. Operation of doubletalk detector 107 is well known in the art and is not discussed further. The plurality of subband error signals 112 passed through doubletalk detector 109 are supplied to subband echo suppressor 108, where residual echo signals are suppressed, as described below in relationship to FIG. 2. A plurality of output signals 113 from subband echo suppressor 108 is supplied to subband noise fill unit 114. Operation of noise fill unit 114 is well known in the art and is not discussed further. The plurality of subband signals including any noise fill are supplied from subband noise fill unit 114 to subband synthesis filter bank 115, where they are recombined to form an outgoing signal. The outgoing signal is then supplied as an output via a send out terminal to a far end party. It is noted that the bandwidths of the subbands in subband analysis filter banks 102 and 110 and those in subband synthesis filter bank 115 are identical.

FIG. 2 shows, in simplified block diagram form, details of a subband echo suppressor, in accordance with the invention. At the outset it felt best to discuss the subband suppression gain computation, as well as, the short-term and long-term envelope computations. Noting that a particular subband is indicated by k=1 through N and n is a time index, it is believed helpful to define certain terms as follows:

$z_{ri}(k,n)$   Receive-in subband time series
$z_{si}(k,n)$   Send-in subband time series -continued

| | |
|---|---|
| $z_e(k,n)$ | Output-error subband time series |
| $E_{ri}(k,n)$ | Receive-in short-term envelope |
| $E_e(k,n)$ | Output-error short-term envelope |
| $\overline{E}_{ri}(k,n)$ | Receive-in long-term envelope updated only in receive state (far end speech only condition) |
| $\overline{E}_{si}(k,n)$ | Send-in long-term envelope updated only in receive state (far end speech only condition) |
| $\overline{E}_e(k,n)$ | Output-error long-term envelope updated only in receive state (far end speech only condition) |
| $G(k,n)$ | Echo path signal gain |
| $g(k,n)$ | Computed suppression gain |

For simplicity and clarity of exposition, the subband index k is not used in the following discussion.

Suppression Gain Computation

For each subband, at time index n, the suppression gain g(n) applied to the output-error time series $z_e(n)$ is given by a center-clipping like relationship as follows:

$$g(n) = \begin{cases} g_0 \dfrac{E_e(n)}{E_{ri}(n)}, & \text{if } \dfrac{E_e(n)}{E_{ri}} < \gamma(n) \\ 1, & \text{otherwise,} \end{cases} \quad (1)$$

where $g_0(n)$ is the nominal suppression gain, and $\gamma(n)<1$ is the echo-path-gain-adjusted threshold of suppression engagement, given by:

$$\gamma(n) = \gamma_0 G(n), \quad (2)$$

where $G(n) = \overline{E}_{si}(n)/\overline{E}_{ri}(N)$ and $\gamma_0$ is the nominal suppression threshold (e.g., −20 dB).

In equation (1), suppression gain g(n) is unity (1) for ratios $E_e(n)/E_{ri}(n)$ at or greater than threshold $\gamma(n)$; i.e., no suppression is applied to the subband output-error time series $z_e(n)$. For ratios $E_e(n)/E_{ri}(n)$ less than threshold $\gamma(n)$, the suppression gain g(n) decreases linearly with the ratio $E_e(n)/E_{ri}(n)$, generating a smoothly varying attenuation function whose trajectory towards zero (0) tracks that of the ratio of subband speech envelopes $E_e(n)/E_{ri}(n)$. Note that the value of $E_e(n)/E_{ri}(n)$ can be obtained in a number of ways, for example, $E_e(n)$ and $E_{ri}(n)$ can be computed and then a look-up table can be used to find the quotient. The same technique can also be used to obtain $\overline{E}_{si}(n)/\overline{E}_{ri}(n)$. Typically, the nominal suppression gain is selected to be $g_0(n)=c/\gamma(n)$ with c=1, ½, or ¼ so that the suppression gain g(n) decreases smoothly from unity.

In equation (2), $\gamma(n)$ is proportional to the signal gain in the echo path. For example, if the echo path gain is zero (0), i.e., no echo, the suppression threshold is zero, and g(n)=1; i.e., suppression is not necessary. As the gain in the echo path increases, the magnitude of any residual echo signals at the output of the adaptive echo canceler also increases, i.e., assuming that the adaptive echo canceler produces a level of echo return loss enhancement that is essentially independent of the magnitude of the speech in the receive-in and send-in signal paths. Because the residual echo is greater for greater echo path gain, the suppression threshold must be increased proportionately if the entire echo reduction system is to maintain a constant level of total echo reduction.

In network telephone line echo applications, the echo path gain is usually less than unity (e.g., −12 dB or smaller), and the suppression threshold can be chosen independently of $G(n)$; that is, $G(n)$ in equation (2) may be fixed at nominal level. For acoustic echo cancellation applications, in particular, applications including desktop audio or the like, the echo path gain regularly exceeds unity, and the inclusion of $G(n)$ in equation (2) is critical for maintaining a high quality of service.

It should be noted that, when $G(n)>>1$, the suppression threshold can be close to unity. In such instances, the echo suppressor becomes insensitive to the presence of near end party speech during intervals of doubletalk. Low to moderate levels of near end party speech will be suppressed along with residual echoes unless an accurate doubletalk detector is available to resolve the condition.

Short-Term Envelope and Long-Term Envelope Computations

Computation of the short-term and long-term subband speech envelopes is relatively simple, but critical for good subjective performance. For the receive-in path, the following recursions are used to estimate the short-term and long-term subband speech envelopes:

$$E_{ri}(n) = \begin{cases} |z_{ri}(n)|, & \text{if } |z_e(n)| > E_{ri}(n-1) \\ \alpha E_{ri}(n-1), & \text{otherwise,} \end{cases} \quad (3)$$

$$\overline{E}_{ri}(n) = \beta \overline{E}_{ri}(n-1) + (1-\beta)|z_{ri}(n)|, \quad (4)$$

where $\alpha<1$ and $\beta<1$. The short-term and long-term subband speech envelope estimates for the send-in and output-error paths are treated identically, and as follows:

$$E_e(n) = \begin{cases} |z_e(n)|, & \text{if } |z_e(n)| > E_e(n-1) \\ \alpha E_e(n-1), & \text{otherwise,} \end{cases} \quad (5)$$

$$\overline{E}_{si}(n) = \beta \overline{E}_{si}(n-1) + (1-\beta)|z_{si}(n)|, \quad (6)$$

The long-term subband speech envelopes defined in equations (4) and (6) are standard lowpass filter recursions. Since the long-term subband speech envelopes are used for estimating the echo path gain, these estimates must be updated only during intervals of the presence of receive-in speech, as determined by voice activity detectors. Constant $\beta$ is chosen to produce a time constant of one (1) second or more, relative to the subband time index n.

The short-term subband speech envelopes defined in equations (3) and (5) are exponentially decaying estimates of running maximums. This is an important aspect of the echo suppressor of this invention; for subjectively good performance, the short-term envelope estimates must respond substantially instantaneously to increases in the residual echo. Constant $\alpha$ is chosen to match the length of the physical echo path, with larger time constants for longer echo paths. For long echo paths, the echo and resulting residual echo in the send-in path can linger even though the excitation speech in the receive-in path may have dissipated. Consequently, the short-term envelope estimates must maintain the running maximum over a longer interval. Typically, $\alpha$ is chosen to produce a time constant within the range of 25–75 msec.

Referring now to FIG. 2, there is shown details of a subband echo suppressor 108 including an embodiment of the invention. Specifically, a plurality of subband signals 103, namely, subband signals $z_{ri}(1,n)$ through $z_{ri}(N,n)$, from subband analysis filter bank 102 (FIG. 1) are supplied on a one-to-one basis to subband suppression gain computation units 201-1 through 201-N, respectively. Subband signals 111, i.e., $z_{si}(1,n)$ through $z_{si}(N,n)$, from subband analysis filter bank 110 (FIG. 1) are also supplied on a one-to-one basis to subband suppression gain computation units 201-1 through 201-N, respectively. A plurality of outgoing subband error signals 112 from subband adaptive echo canceler 104 (FIG. 1), possibly including residual echo components, is supplied to subband echo suppressor 108. The subband error signals 112, namely, $z_e(i,n)$ through $z_e(N,n)$, are supplied on a one-to-one basis to subband suppression gain computation units 201-1 through 301-N, respectively, and to multipliers 213-1 through 213-N, respectively. Computed suppression gain values $g(1,n)$ through $g(N,n)$ are supplied from subband suppression gain computation units 201-1 through 201-N to multipliers 208-1 through 208-N, respectively. The mixed signal outputs 113 from multipliers 208-1 through 208-N are supplied as outputs from subband echo suppressor 108.

All of subband suppression gain computation units 201 are identical in structure and operation. Consequently, only subband suppression gain computation unit 201-1 is described in detail. It is noted that although all of subband suppression computation units 201 are identical, each of units 201 operates on signals in a particular corresponding subband in generating the suppression gain value for that subband. Thus, the receive-in subband time series signal $z_{ri}(1,n)$ for band k=1 is supplied to short-term envelope unit 202 and to long-term envelope unit 203. Short-term envelope unit 202 generates the short-term envelope $E_{ri}(1,n)$ of $z_{ri}(1,n)$, in accordance with equation (3) above, and supplies it to suppression gain computation unit 204. Long-term envelope unit 203 generates the long-term envelope $\overline{E}_{ri}(1,n)$ of $z_{ri}(1,n)$, in accordance with equation (4) above, and supplies it to echo path gain computation unit 205. Similarly, send-in subband time series signal $z_{si}(1,n)$ is supplied to long-term envelope unit 206, which generates its long-term envelope $\overline{E}_{si}(1,n)$ in accordance with equation (6) above, and supplies it to echo path gain computation unit 205. Error signal $z_e(1,n)$ is supplied to short-term envelope unit 207, which generates its short-term envelope $E_e(1,n)$, in accordance with equation (5) above, and supplies it to suppression gain computation unit 204. It is again noted that the long-term envelopes are generated only during intervals of the presence of receive-in speech. This is controlled by employing voice activity detectors (not shown), in well known fashion. As indicated, envelopes $\overline{E}_{ri}(1,n)$ and $\overline{E}_{si}(1,n)$ are supplied from long-term envelope units 203 and 206, respectively, to echo path gain computation unit 205. Echo path gain computation unit 205 generates echo path signal gain $G(1,n)=\overline{E}_{si}(1,n)/\overline{E}_{ri}(1,n)$, which is also supplied to suppression gain computation unit 204. Suppression gain computation unit 204 generates the suppression gain $g(1,n)$, in accordance with equation (1) above, and supplies it to multiplier 213-1.

What is claimed is:

1. A subband echo suppressor comprising:

a first filter bank including plurality of first filters for establishing a predetermined number of subbands and for decomposing a received signal into a corresponding number of receive subband signals;

a second filter bank including a plurality of second filters equal in number to said plurality of first filters for establishing a corresponding number of subbands and for decomposing a transmit signal into said predetermined number of transmit subband signals;

a plurality of subband echo cancelers supplied on a one-to-one basis with said number of subband receive signals and said number of subband transmit signals for generating a corresponding number of subband echo canceler error signals;

a plurality of subband suppression gain computation units being responsive on a one-to-one basis to said predetermined number of receive subband signals, on a one-to-one basis to said predetermined number of transmit subband signals and on a one-to-one basis to said number of subband echo canceler error signals for generating said predetermined number of subband suppression gain values, each of said plurality of subband suppression gain calculation units includes echo path gain computation apparatus including a first long-term envelope generator supplied with said corresponding receive subband signal for generating a corresponding long-term subband receive signal envelope $\overline{E}_{ri}(k,n)$, a second long-term envelope generator supplied with said corresponding echo canceler error subband signal for generating a corresponding long-term subband echo canceler error signal envelope $\overline{E}_{si}(k,n)$ and a subband echo path gain computation unit supplied with said corresponding long-term subband receive signal envelope and corresponding long-term subband transmit signal envelope for generating said corresponding subband echo path gain value in accordance with $G(k,n)=\overline{E}_{si}(k,n)/\overline{E}_{ri}(k,n)$, and a first short-term envelope generator supplied with said corresponding receive subband signal for generating a corresponding short-term subband receive signal envelope $E_{ri}(n)$, a second short-term envelope generator supplied with a corresponding subband echo canceler error signal for generating a corresponding short-term subband echo canceler error signal envelope $E_e(n)$ and a subband gain computation apparatus supplied with said corresponding subband echo path gain value, said corresponding short-term subband receive signal envelope, and said corresponding short-term subband transmit signal envelope for generating a corresponding subband suppression gain value in accordance with $$g(n) = \begin{cases} g(0)\frac{E_e(n)}{E_{ri}(n)}, & \text{if } \frac{E_e(n)}{E_{ri}(n)} < \gamma(n) \\ 1, & \text{otherwise,} \end{cases}$$

where k is the subband index, $g_0(k,n)$ is the nominal suppression gain, and $\gamma(k,n)<1$ is the echo-path-gain-adjusted threshold of suppression engagement, given by $\gamma(k,n)=\gamma_0 G(k,n)$, and where $Z_{ri}(k,n)$ is the receive-in subband time series, subband time $Z_e(k,n)$ is the output-error subband time series, $E_{ri}(k,n)$ is the receive-in short-term envelope, $E_e(k,n)$ output-error short-term envelope, $\overline{E}_{ri}(k,n)$ is the receive-in long-term envelope updated only in receive state (far end speech only condition), $\overline{E}_{si}(k,n)$ is the send-in long-term envelope updated only in receive state (far end speech only condition), $G(k,n)$ is the subband echo path signal gain, $g(k,n)$ is the subband suppression gain and where $\alpha<1$ and $\beta<1$;

a plurality of mixers supplied on a one-to-one basis with said predetermined number of subband echo canceler error signals and on a one-to-one basis with said predetermined number of subband suppression gain values for generating said predetermined number of subband output signals; and a subband synthesis filter bank supplied with said predetermined number of subband output signals for synthesizing an output signal.

2. The invention as defined in claim 1 wherein said long-term subband receive envelope and said long-term subband transmit signal envelope are updated only during intervals of the presence of receive-in speech signals.

3. The invention as defined in claim 2 wherein said corresponding short-term subband receive signal envelope is generated in accordance with $$E_{ri}(n) = \begin{cases} |z_{ri}(n)|, & \text{if } |z_e(n)| > E_{ri}(n-1) \\ E_{ri}(n-1), & \text{otherwise,} \end{cases}$$

said corresponding short-term subband echo canceler error signal envelope is generated in accordance $$E_e(n) = \begin{cases} |z_e(n)|, & \text{if } |z_e(n)| > E_e(n-1) \\ \alpha E_e(n-1), & \text{otherwise,} \end{cases}$$

said corresponding long-term subband receive signal envelope is generated in accordance with $\overline{E}_{ri}(k,n) = \beta \overline{E}hd\ ri(k,n-1) + (1-\beta)\ |z_{ri}(k,n)|$, said corresponding long-term subband echo canceler error signal envelope is generated in accordance with, $\overline{E}_{st}(k,n) = \beta \overline{E}_{st}(k,n-1) + (1\beta)|z_{st}(k,n)|$.

* * * * *

UNITED STATES PATENT AND TRADEMARK OFFICE
CERTIFICATE OF CORRECTION

PATENT NO.    : 6,442,275 B1
DATED         : August 27, 2002
INVENTOR(S)   : Eric J. Diethron It is certified that error appears in the above-identified patent and that said Letters Patent is hereby corrected as shown below:

<u>Title page,</u>
Item [73], Assignee, "Lucent Technologies Inc, Murray Hill, NJ (US)" should be deleted and replaced with -- Agere Systems Guardian Corp., Orlando, FL (US) --

Signed and Sealed this

Fifth Day of August, 2003

JAMES E. ROGAN
*Director of the United States Patent and Trademark Office*